US010919643B1

(12) United States Patent
Palaniappan

(10) Patent No.: US 10,919,643 B1
(45) Date of Patent: Feb. 16, 2021

(54) AIRCRAFT LIGHT FIXTURE ENERGY HARVESTING

(71) Applicant: Goodrich Corporation, Charlotte, NC (US)

(72) Inventor: Elangovan Palaniappan, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/654,169

(22) Filed: Oct. 16, 2019

(30) Foreign Application Priority Data

Aug. 14, 2019 (IN) .............................. 201911032888

(51) Int. Cl.
| | | |
|---|---|---|
| B64D 47/02 | (2006.01) | |
| F21S 9/02 | (2006.01) | |
| H02J 7/00 | (2006.01) | |
| F21V 23/04 | (2006.01) | |
| H02N 11/00 | (2006.01) | |

(52) U.S. Cl.
CPC ............... *B64D 47/02* (2013.01); *F21S 9/02* (2013.01); *F21V 23/04* (2013.01); *H02J 7/0068* (2013.01); *B64D 2203/00* (2013.01); *H02N 11/002* (2013.01)

(58) Field of Classification Search
CPC ..... B64D 47/02; B64D 2203/00; F21V 23/04; F21S 9/02; H02J 7/0068; H02N 11/002
See application file for complete search history.

(56) References Cited

U.S. PATENT DOCUMENTS

| | | | |
|---|---|---|---|
| 9,013,119 B2 | 4/2015 | Simon et al. | |
| 9,347,628 B2 | 5/2016 | Seo et al. | |
| 9,739,430 B2 | 8/2017 | Lang | |
| 9,799,816 B2 | 10/2017 | Chung | |
| 9,832,832 B2 | 11/2017 | Chemel et al. | |
| 10,251,234 B2 | 4/2019 | Hirshberg | |
| 2002/0153842 A1* | 10/2002 | Vo .......................... | G02B 23/12 |
| | | | 315/149 |
| 2008/0234893 A1 | 9/2008 | Mitchell et al. | |

(Continued)

FOREIGN PATENT DOCUMENTS

| | | |
|---|---|---|
| CN | 105782890 A | 7/2016 |
| EP | 3165890 A1 | 5/2017 |

OTHER PUBLICATIONS

"Energy Harvesting PMIC." Cypress. Embedded in Tomorrow., https://www.cypress.com/products/energy-harvesting-pmics. Accessed Jun. 28, 2019. 3 Pages.

(Continued)

*Primary Examiner* — Raymond R Chai
(74) *Attorney, Agent, or Firm* — Cantor Colburn LLP

(57) ABSTRACT

Disclosed is an aircraft lighting system disposed in an environment of an aircraft. The system includes a housing. The system includes an illumination element disposed within the housing. The system includes energy generation circuitry configured to generate electricity from the environment. The system includes switching circuitry including a driver operable to control illumination of the illumination element and operated with a driver voltage. The system includes energy harvesting circuitry including a regulator configured to draw energy from the energy generation circuitry and output a regulator voltage at the driver voltage.

17 Claims, 3 Drawing Sheets

(56) References Cited

U.S. PATENT DOCUMENTS

| | | | |
|---|---|---|---|
| 2010/0207573 A1 | 8/2010 | Mo et al. | |
| 2010/0327766 A1 | 12/2010 | Recker et al. | |
| 2011/0115383 A1* | 5/2011 | Tyson, III | H05B 45/58 |
| | | | 315/120 |
| 2011/0234107 A1* | 9/2011 | Simon | H01L 35/00 |
| | | | 315/176 |
| 2011/0235328 A1 | 9/2011 | Xu et al. | |
| 2011/0304268 A1* | 12/2011 | Bertram | H05B 45/20 |
| | | | 315/46 |
| 2013/0300296 A1* | 11/2013 | Mueller | B64D 47/02 |
| | | | 315/130 |
| 2016/0128154 A1 | 5/2016 | Barnetson et al. | |
| 2017/0279300 A1* | 9/2017 | Catalano | H02J 9/061 |
| 2018/0166901 A1* | 6/2018 | Yu | H02J 7/35 |
| 2018/0337551 A1 | 11/2018 | Park et al. | |
| 2019/0182924 A1 | 6/2019 | Hirshberg | |
| 2020/0060003 A1* | 2/2020 | Wang | H05B 47/16 |

OTHER PUBLICATIONS

Glaser, C. Power Management. "IQ: What it is, what it isn't, and how to use it." Texas Instruments Incorporated. http://www.ti.com/lit/an/slyt412/slyt412.pdf. Accessed Jun. 28, 2019. 7 Pages.

Li, H. et al. "Energy harvesting from low frequency applications using piezoelectric materials". Applied Physics Reviews. 2014. https://pdfs.semanticscholar.org/6e43/9e98eb814caf31dd7ac79e0eeb5f6c8a15cc.pdf?_ga=2.178346657.409957723.1561702398-887338353.1561702398. Accessed Jun. 28, 2019. pp. 041301-1-041301-20.

Meng He, Maxin Integrated. Power Systems Design. Information to Power Your Designs. "Quiescent current in power supply designs." May 7, 2016. https://www.compel.ru/wordpress/wp-content/uploads/2017/11/quiescent-current-in-power-supply-designs.pdf. Accessed Jun. 28, 2019. 4 Pages.

Rastegar, Jahangir and Harbans S. Dhadwal. Energy Harvesting for Low-Power Autonomous Devices and Systems. SPIE Press Book. Date Published: Feb. 21, 2017. https://spie.org/samples/TT108.pdf. Accessed Jun. 28, 2019. pp. 1-7.

Texas Instruments. "BiCMOS Power Factor Preregulator." Dec. 2008. https://www.ti.com/lit/ds/symlink/ucc2818-ep.pdf. Accessed Jun. 28, 2019. 24 Pages.

What is quiescent current? All About Circuits Forum. General Electronics Chat started by sharath_412, May 17, 2007. Retrieved Jun. 28, 2019 from https://forum.allaboutcircuits.com/threads/what-is-quiescent-current.5932/. 4 Pages.

European Search Report issued in European Application No. 20190513.0; Application Filing Date Aug. 11, 2020; dated Jan. 13, 2021 (6 pages).

* cited by examiner

AIRCRAFT LIGHT FIXTURE ENERGY HARVESTING

CROSS-REFERENCE TO RELATED APPLICATIONS

This application claims the benefit of Indian Application No. 201911032888 filed Aug. 14, 2019, the disclosure of which is incorporated herein by reference in its entirety.

BACKGROUND

The present disclosure relates to the art of aircraft lighting systems. Aircraft lighting systems may illuminate environments inside and outside the aircraft.

Lighting systems may blink or flicker projected light to increase visual awareness. Energy provided to such lighting systems may be wasted due to heating losses, extraneous lighting, or other forms of energy. Lighting systems may be further subjected to vibrations or other energy forms.

BRIEF DESCRIPTION

Disclosed is an aircraft lighting system disposed in an environment of an aircraft. The system includes a housing. The system includes an illumination element disposed within the housing. The system includes energy generation circuitry configured to generate electricity from the environment. The system includes switching circuitry including a driver operable to control illumination of the illumination element and operated with a driver voltage. The system includes energy harvesting circuitry including a regulator configured to draw energy from the energy generation circuitry and output a regulator voltage at the driver voltage.

In addition to one or more of the features described above, or as an alternative, further embodiments may include control circuitry defining a control circuitry voltage, the control circuitry operable to output a control signal to the driver.

In addition to one or more of the features described above, or as an alternative, further embodiments may include that the regulator voltage is defined at the control circuitry voltage.

In addition to one or more of the features described above, or as an alternative, further embodiments may include that the control signal is pulse width modulated.

In addition to one or more of the features described above, or as an alternative, further embodiments may include that the control circuitry is a synchronization controller, and the control signal includes synchronization commands such that the driver operates according the synchronization commands.

In addition to one or more of the features described above, or as an alternative, further embodiments may include that the control circuitry is a timing controller, and the control signal includes timing commands such that the driver operates according to the timing commands.

In addition to one or more of the features described above, or as an alternative, further embodiments may include that the control circuitry is a signal conditioner, and the control signal is conditioned according to the signal conditioner.

In addition to one or more of the features described above, or as an alternative, further embodiments may include that the energy harvesting circuitry includes a switch operable to disconnect the control circuitry from the regulator when energy from the energy generation circuitry is below a predetermine threshold.

In addition to one or more of the features described above, or as an alternative, further embodiments may include monitoring circuitry defining a monitoring circuitry voltage, the monitoring circuitry operable to output diagnostic information related to the lighting system.

In addition to one or more of the features described above, or as an alternative, further embodiments may include that the regulator voltage is defined at the monitoring circuitry voltage.

In addition to one or more of the features described above, or as an alternative, further embodiments may include that the monitoring circuitry is an elapsed time counter, and the diagnostic information includes an actuation count of the illumination element.

In addition to one or more of the features described above, or as an alternative, further embodiments may include that the monitoring circuitry is a luminance monitor, and the diagnostic information includes a maximum luminance of the illumination element.

In addition to one or more of the features described above, or as an alternative, further embodiments may include that the monitoring circuitry is a temperature monitor, and the diagnostic information includes a temperature associated with the illumination element.

In addition to one or more of the features described above, or as an alternative, further embodiments may include that the monitoring circuitry is a water monitor, and the diagnostic information includes a water indication associated with the housing.

In addition to one or more of the features described above, or as an alternative, further embodiments may include that the energy harvesting circuitry includes a switch operable to disconnect the monitoring circuitry from the regulator when energy stored in a capacitor associated with the energy generation circuitry is below a predetermine threshold.

In addition to one or more of the features described above, or as an alternative, further embodiments may include that the energy harvesting circuitry supplements the energy from a power connection that provides the energization of the illumination element.

Also disclosed is an aircraft lighting system disposed in an environment of an aircraft. The aircraft lighting system includes a housing. The aircraft lighting system includes an illumination element disposed within the housing. The aircraft lighting system includes energy generation circuitry configured to generate electricity from the environment. The aircraft lighting system includes switching circuitry including a driver operable to control illumination of the illumination element and operated with a driver voltage. The aircraft lighting system includes control circuitry a control circuitry voltage, the control circuitry operable to output a control signal to the driver. The aircraft lighting system includes energy harvesting circuitry including a regulator configured to draw energy from the energy generation circuitry and output a regulator voltage defined at the driver voltage.

In addition to one or more of the features described above, or as an alternative, further embodiments may include monitoring circuitry defining a monitoring circuitry voltage and the regulator voltage is defined at the monitoring circuitry voltage, the monitoring circuitry operable to output diagnostic information related to the lighting system.

In addition to one or more of the features described above, or as an alternative, further embodiments may include that the energy generation circuitry includes a Seebeck generator that converts heat energy from the environment to electrical energy.

Also disclosed is an aircraft lighting system disposed in an environment of an aircraft. The aircraft lighting system includes a housing. The aircraft lighting system includes an illumination element disposed within the housing. The aircraft lighting system includes energy generation circuitry configured to generate electricity from the environment. The aircraft lighting system includes switching circuitry including a driver operable to control illumination of the illumination element and operated with a driver voltage. The aircraft lighting system includes monitoring circuitry defining a monitoring circuitry voltage, the monitoring circuitry operable to output diagnostic information related to the illumination element. The aircraft lighting system includes energy harvesting circuitry including a regulator configured to draw energy from the energy generation circuitry and output a regulator voltage defined at the driver voltage.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Aircraft may include lighting systems to illuminate internal and external environments. Such lighting systems may blink or flicker, requiring additional switching circuitry to control the flow of electricity to illumination elements. Switching circuitry may discharge heat due to switching losses along with other circuitry associated with the lighting system.

As disclosed herein, energy harvesting circuitry may be employed to capture wasted energy from heat, light, vibration, and other energy sources. For example, heat energy harvesting may be performed by Seebeck generators. Light energy harvesting may be performed, as an example, on refracted or reflected light within the lighting system housing by photovoltaic generators. As an example, vibration energy harvesting may be performed by piezoelectric generators. Further, the generation of blinking or flickering light may enable increased value return for energy harvesting circuitry on aircraft.

Figure 1:
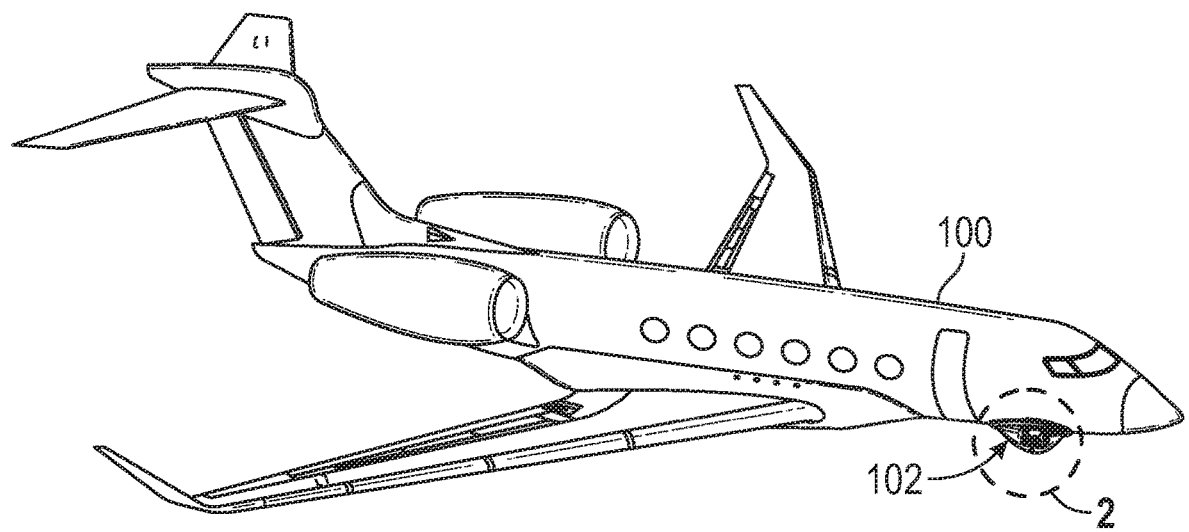
FIG. 1 illustrates an example aircraft having a lighting system.

FIG. 1 illustrates an example of a commercial aircraft 100 having an aircraft lighting system or a lighting system 102. The lighting system 102 may be disposed in various locations in any environment of the aircraft 100. An environment may include or define particular atmospheric parameters (e.g., temperature, humidity, pressure). As an example, the lighting system 102 may be disposed on the interior of the aircraft 100 as wash lights or other implements. Lighting system 102 may be disposed on the exterior of the aircraft 100 as strobe or multifunction lights, including landing lights, taxi lights, strobe lights, beacon lights, and tail navigation lights.

Figure 2:
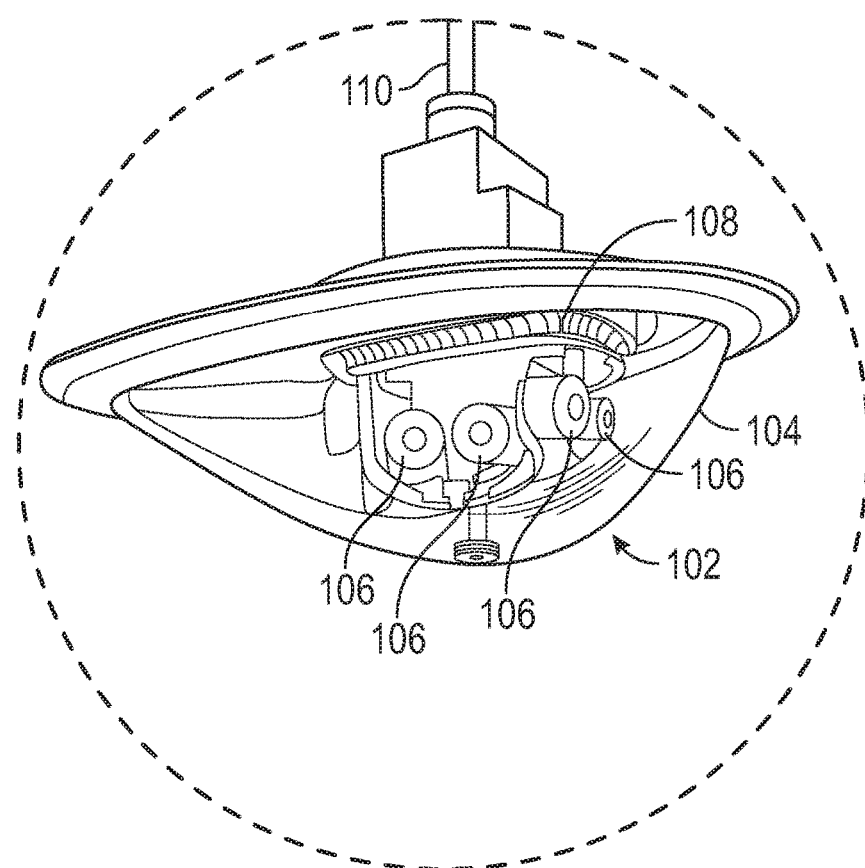
FIG. 2 illustrates an example lighting system.

As shown in FIG. 2, the lighting system 102 may include any number of circuitries or other implementations to perform the requisite actions. Portions of the circuitry may be disposed within the housing 104. Portions of the circuitry may be disposed outside of the housing 104. For example, energy generation circuitry 136 may be a Seebeck generator having a hot plate inside the housing 104 and attached to the heatsink 132, while the cold plate may be disposed outside the housing 104. The energy generation circuitry 136 may further be disposed as a portion of the housing 104. The lighting system 102 may include an illumination element 106. The illumination element 106 may also include one or more illumination elements. The illumination element 106 may be a light-emitting diode (LED), High Intensity Discharge Lamps, Organic LEDs, incandescent filament, combinations thereof, or any other implement. The illumination element 106 may be connected with a printed circuit board 108. The printed circuit board 108 may conduct heat from circuitry disposed thereon.

The lighting system 102 may include an input conduit that includes a power connection 110 to aircraft power systems. The power connection 110 may be connected to a 115-volt bus associated with the aircraft 100. The 115-volt bus may conduct alternating current. The current may alternate at 400 Hz. The power connection 110 may receive any type of power to energize the lighting system 102. It should be appreciated that any of the circuitry or functional blocks shown in FIG. 2 may be added, removed, or duplicated based on the type of power received from the power connection 110.

Figure 3:
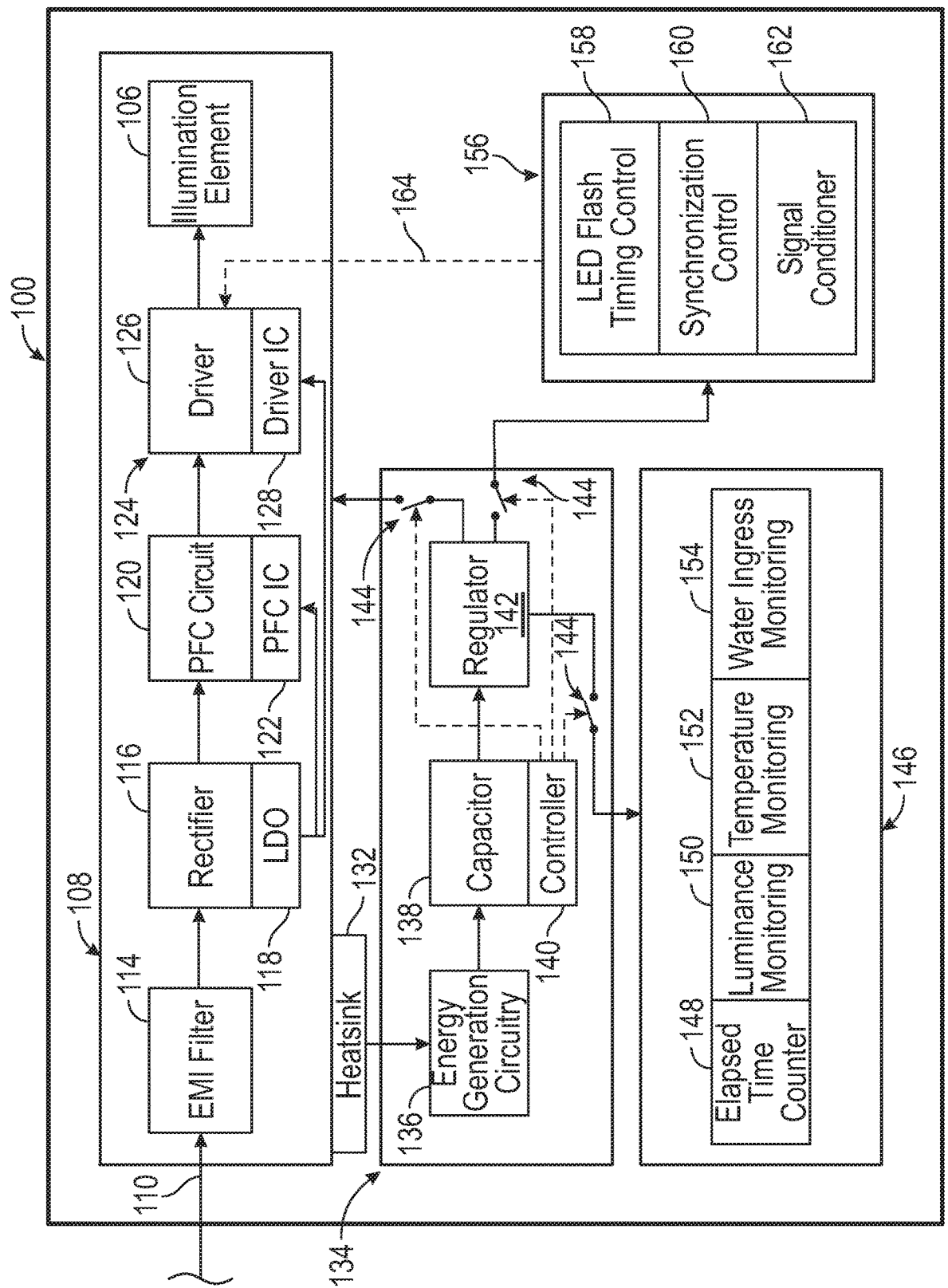
FIG. 3 illustrates an example energy generation circuitry.
Figure 4:
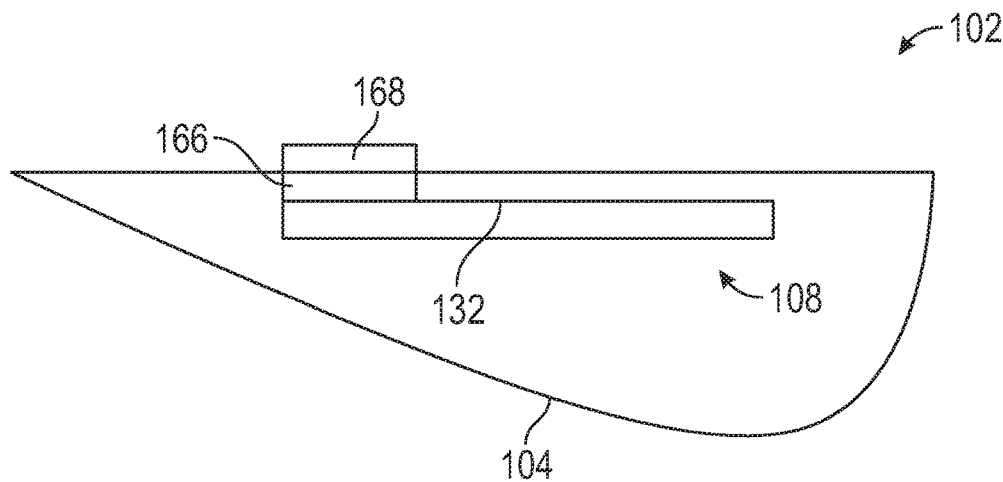
FIG. 4 illustrates a schematic diagram of a lighting system including energy harvesting circuitry.

Referring to FIGS. 3-4, the aircraft 100 includes circuitry for monitoring, controlling, and energizing the illumination elements 106. Power connection 110 is connected with a printed circuit board 108. The printed circuit board 108 may include electromagnetic interference circuitry 114 for receiving the raw power input from power connection 110 and to remove noise. The rectifier 116 may convert the 115-volt alternating current to 28-volt direct current. A low-dropout regulator 118, or another type of voltage regulator, may provide reduced voltages to the power factor correction integrated circuitry 122 and the driver integrated circuit 128. The rectified, and potentially voltage-controlled, direct current from the rectifier 116 is provided to the power factor correction circuit 120. The power factor correction circuit 120 is provided to switching circuitry 124. The switching circuitry 124 may include any number of switches for energizing and deenergizing the illumination element 106. The switching circuitry 124 may include a driver 126 for driving the illumination element 106. The driver integrated circuit 128 may be operated by a driver voltage. The driver voltage may be a quiescent voltage or a quiescent power requirement associated with the driver 126 and the driver integrated circuit 128. Quiescent voltage or power may include the non-switching or non-operating power requirements of the integrated circuit.

The printed circuit board 108 may include a heatsink 132. The heatsink 132 may be thermally conductive with the entire printed circuit board 108. The heatsink 132 may be thermally conductive with the illumination element(s) 106. The heatsink 132 may be thermally conductive with any energy generating or heat generating parts associated with the printed circuit board 108. One or more printed circuit boards 108 or printed circuit board portions may be used. The printed circuit board may include FR-4 or metallic materials. The heatsink 132 may be associated with particular heat generative devices on the printed circuit board 108. The heatsink 132 provides heat to the energy harvesting circuitry 134. The energy generation circuitry 136 may be a Seebeck generator having a hot side 166 connected to the heatsink 132 and a cold side 168. The cold side 168 may be connected anywhere that is cooler than the heatsink 132. The cold side may be connected to or arranged about the housing 104. The illumination element 106 may be directly mounted on the printed circuitry board 108, heating one side of the printed circuit board 108 to cause the Seebeck Effect.

It should be appreciated that the heatsink 132 may be any type of energy-conductive device. As an example, the heatsink 132 may be a rigid, vibration-transmitting element when associated with energy generation circuitry 136 that is piezoelectric. As an example, the heatsink 132 may be a light-conduit such as an optical fiber for transmitting light generated by the illumination element 106 when associated with energy generation circuitry 136 that is photovoltaic.

The energy generation circuitry 136 may be connected with a capacitor 138 or another energy storage device to collect the energy generated by the energy generation circuitry 136. The energy stored in the capacitor 138 may be transferred to the regulator 142. The regulator 142 may convert the capacitor voltage to suitable regulator voltages for consumption by the switching circuitry 124, the monitoring circuitry 146, and the control circuitry 156. For example, the control circuitry 156 may require 15-volt, 5-volt, or 3.3-volt energization.

The regulator 142 may output a regulator voltage defined commensurate with the monitoring circuitry 146 voltages. As an example, the elapsed time counter 148 may require a 3.3-volt supply. The regulator 142 may include regulatory circuitry operable to provide the 3.3-volt supply. As another example, the luminance monitor 150 may require a 15-volt supply. The regulator 142 may include regulatory circuitry operable to provide the 15-volt supply. As another example, the temperature monitor 152 may require a 5-volt supply. The regulator 142 may include regulatory circuitry operable to provide the 5-volt supply. As another example, the water ingress monitoring or water monitor 154 may require a 3.3-volt supply. The regulator 142 may include regulatory circuitry operable to provide the 3.3-volt supply. Monitoring circuitry 146 may record information related to the operation of the lighting system 102 in a data repository or provide information to aircraft controllers.

The elapsed time counter 148 may provide diagnostic information that includes an actuation count of the illumination element 106. That is, the number of illuminations or a running time of illumination of the illumination element 106 or lighting system 102. The luminance monitor 150 may provide diagnostic information that includes a maximum luminance of the illumination element 106. The luminance may be a maximum brightness or a calculated maximum brightness of the illumination element 106. The temperature monitor 152 may provide diagnostic information that includes a temperature associated with the illumination element 106. The water monitor 154 may provide diagnostic information that includes a water indication or water intrusion indication associated with the housing 104. The water monitor 154 may also provide humidity information associated with the housing 104.

The regulator 142 may output a regulator voltage defined according to the control circuitry 156 voltages. As an example, the timing controller 158 may require a 5-volt supply. The regulator 142 may include regulatory circuitry operable to provide the 5-volt supply. As another example, the synchronization controller 160 may require the 3.3-volt supply. The regulator 142 may include regulatory circuitry operable to provide a 3.3-volt supply. As another example, the signal conditioner 162 may require a 15-volt supply. The regulator 142 may include regulatory circuitry operable to provide the 15-volt supply.

The control circuitry 156 may provide command and control signals to the switching circuitry 124. The synchronization controller 160 may provide synchronization commands such that the driver 126 operates according the synchronization commands. As such, the illumination element 106 may illuminate according to the illumination of other illumination elements. The timing controller 158 may provide timing commands such that the driver 126 operates according to the timing commands. As such, the illumination element 106 may blink at a predetermined rate. The signal conditioner 162 may improve the control signal 164 or condition the control signal 164. The control signal 164 may be a pulse width modulated signal to the driver 126 or driver integrated circuit 128.

The regulator 142 may output regulator voltage defined according to the switching circuitry 124 or other circuitry on the printed circuit board 108. As an example, the driver 126 may require a 28-volt supply. The regulator 142 may include regulatory circuitry operable to provide the 28-volt supply. As an example, the driver integrated circuit 128 may require a 5-volt supply. The regulator 142 may include regulatory circuitry operable to provide the 5-volt supply.

It should be appreciated that any voltage or power regulation circuitry may be used to provide the desired voltages. As a brief, non-limiting example, the regulator 142 may be a low-dropout regulator, Zener diode regulator, or another implement. A controller 140 may be implemented to provide harvested energy to the monitoring circuitry 146, control circuitry 156, and/or switching circuitry 124 on demand. For example, necessary loads may include the control circuitry 156, the monitoring circuitry 146, or portions thereof. The controller 140 may operate switches 144 or may be operable to open close the switches 144 to direct harvested energy as necessary. The switches 144 may be operable to disconnect the control circuitry 156, the monitoring circuitry 146 or portions thereof based on the energy harvested and stored in the capacitor 138. As an example, coulomb counting or voltage measurements may determine the energy stored in the capacitor 138. The controller 140 may disconnect loads that are not necessary for operation of the illumination element 106 in response to the energy stored in the capacitor 138 falling below a predetermined threshold. As one of many examples, the luminance monitor 150 may be disconnected when energy falls below the predetermined threshold.

Figure 5:
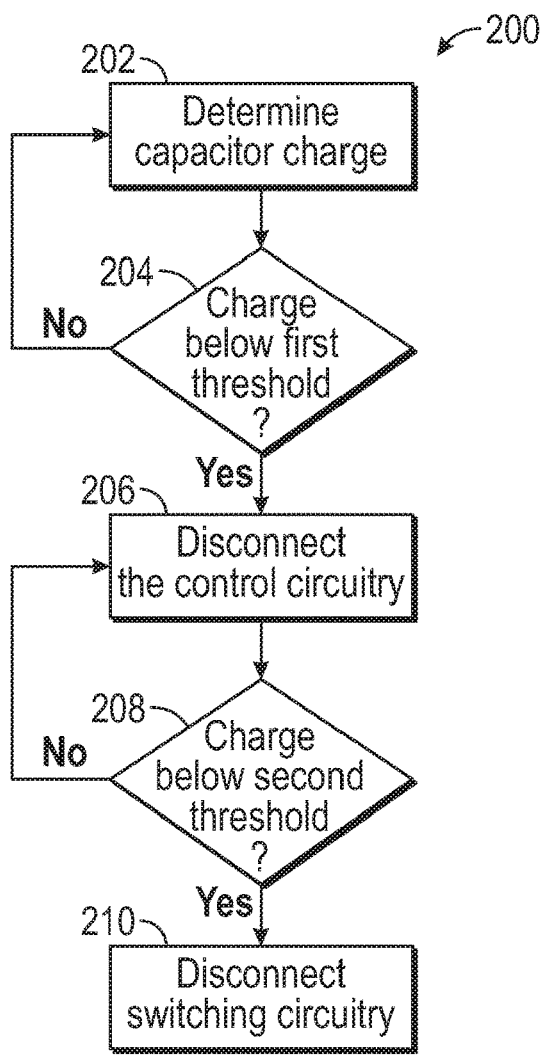
FIG. 5 illustrates a method for disconnecting loads based on harvested energy.

Referring to FIG. 5, a generalized flow diagram 200 of the operations that may or may not be performed. It should be appreciated that any of the steps may be omitted, duplicated, rearranged, or performed in parallel. The generalized flow diagram 200 includes a determination of charge stored in the capacitor 138. If the charge of the capacitor 138 is below a first predetermined threshold, in block 204, the control circuitry 156, or portions thereof, may be disconnected. If the charge of the capacitor 138 is below a second predetermined threshold, in block 208, the switching circuitry 124 may be disconnected in block 210. The predetermined thresholds may be an energy storage value calculated by one or more controllers 140. Such disconnection may allow normal auxiliary power to provide energization of such circuits. It should be appreciated that disconnection may be based on the voltage supplied by the regulator 142. Higher voltages may be shed before lower voltages are shed.

The controller 140 may include any combination of processors, field programmable gate arrays (FPGA), or application specific integrated circuits (ASIC). The controller 140 may include memory, volatile and non-volatile, operable to store machine instructions from the processors and other processing mechanisms to receive, calculate, and control devices, as necessary. Machine instructions may be stored (e.g., stored instructions, stored machine instructions, stored steps) in any language or representation, including but not limited to machine code, assembly instructions, C, C++, C #, PYTHON, JAVA, and RUBY. It should be appreciated that any type of wired or wireless configuration is appreciated for any of the communications from the controller 140. Wireless protocols such as ZIGBEE, WI-FI, Near-Field Communications (NFC), BLUETOOTH, or any other implement may be used. Communications may be realized through any protocol or medium known or unknown. Any number of controllers 140 may be implemented to individually or collectively provide the necessary operations.

It should be appreciated that voltage and current descriptions herein are merely to describe an example system. Any type of voltage and current may be used to implement the teachings described herein.

The term "about" is intended to include the degree of error associated with measurement of the particular quantity based upon the equipment available at the time of filing the application.

The terminology used herein is for the purpose of describing the features associated with the present disclosure and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to features and parts, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to any particular features or parts disclosed as the best mode contemplated for carrying out this present disclosure, but that the present disclosure will include all that falls within the scope of the claims.

What is claimed is:

1. An aircraft lighting system disposed in an environment of an aircraft comprising:
    a housing;
    a printed circuit board (PCB) disposed within the housing;
    an illumination element connected to the PCB disposed within the housing, the PCB configured to receive heat in response to illuminating the illumination element;
    a heatsink thermally coupled to the PCB and configured to receive the heat from the PCB;
    energy generation circuitry in thermal communication with the heatsink and configured to generate electricity in response to receiving the heat from the heatsink;
    switching circuitry including a driver operable to control illumination of the illumination element and operated with a driver voltage; and
    energy harvesting circuitry including a regulator configured to draw energy from the energy generation circuitry and output a regulator voltage at the driver voltage, and configured to measure the energy from the energy generation circuitry and to determine an energy demand associated with the switching circuitry and control circuitry based on a comparison between the energy from the energy generation circuitry and one or more predetermined thresholds,
    wherein the energy harvesting circuitry includes a first switch operable to disconnect the regulator from the control circuitry when the energy from the energy generation circuitry is below the one or more predetermined thresholds, and a second switch operable to disconnect the regulator from the PCB when the energy from the energy generation circuitry is below the one or more predetermined thresholds.

2. The aircraft lighting system of claim 1, wherein the control circuitry defines a control circuitry voltage, the control circuitry operable to output a control signal to the driver.

3. The aircraft lighting system of claim 2, wherein the regulator voltage is defined at the control circuitry voltage.

4. The aircraft lighting system of claim 2, wherein the control signal is pulse width modulated.

5. The aircraft lighting system of claim 2, wherein the control circuitry is a synchronization controller, and the control signal includes synchronization commands such that the driver operates according the synchronization commands.

6. The aircraft lighting system of claim 2, wherein the control circuitry is a timing controller, and the control signal includes timing commands such that the driver operates according to the timing commands.

7. The aircraft lighting system of claim 2, wherein the control circuitry is a signal conditioner, and the control signal is conditioned according to the signal conditioner.

8. The aircraft lighting system of claim 1, further comprising monitoring circuitry defining a monitoring circuitry voltage, the monitoring circuitry operable to output diagnostic information related to the aircraft lighting system.

9. The aircraft lighting system of claim 8, wherein the regulator voltage is defined at the monitoring circuitry voltage.

10. The aircraft lighting system of claim 8, wherein the monitoring circuitry is an elapsed time counter, and the diagnostic information includes an actuation count of the illumination element.

11. The aircraft lighting system of claim 8, wherein the monitoring circuitry is a luminance monitor, and the diagnostic information includes a maximum luminance of the illumination element.

12. The aircraft lighting system of claim 8, wherein the monitoring circuitry is a temperature monitor, and the diagnostic information includes a temperature associated with the illumination element.

13. The aircraft lighting system of claim 8, wherein the monitoring circuitry is a water monitor, and the diagnostic information includes a water indication associated with the housing.

14. The aircraft lighting system of claim 8, wherein the energy harvesting circuitry includes a capacitor configured to store the energy and a switch operable to disconnect the monitoring circuitry from the regulator when the energy stored in the capacitor associated with the energy generation circuitry is below the one or more predetermined thresholds.

15. The aircraft lighting system of claim 1, wherein the energy harvesting circuitry supplements the energy from a power connection that provides the energization of the illumination element.

16. The aircraft lighting system of claim 15, further comprising monitoring circuitry defining a monitoring circuitry voltage and the regulator voltage is defined at the monitoring circuitry voltage, the monitoring circuitry operable to output diagnostic information related to the aircraft lighting system.

17. The aircraft lighting system of claim 1, wherein the energy generation circuitry includes a Seebeck generator that converts heat energy from the heat sink to electrical energy.

* * * * *